United States Patent Office 3,577,437
Patented May 4, 1971

3,577,437
EPOXY RESINS FROM ALKYLATED PHENOL NOVOLAC RESINS
John R. Le Blanc, Wilbraham, Mass., assignor to Monsanto Company, St. Louis, Mo.
No Drawing. Filed Jan. 6, 1969, Ser. No. 789,346
Int. Cl. C08g *5/08, 30/06*
U.S. Cl. 260—33.6             14 Claims

ABSTRACT OF THE DISCLOSURE

Improved epoxy novolac resins produced by first reacting epichlorohydrin with an alkylated phenol aldehyde novolac resin wherein said alkylate is a specific $C_8$ through $C_{13}$ mixture of carbocyclic compounds, and then thereafter dehydrohalogenating the resulting product.

BACKGROUND OF INVENTION

Epoxy resins are well known in the art, particularly those obtained from etherification of phenol formaldehyde starting material condensates by etherification with halo epoxy alkanes such as epichlorohydrin. Such resins are described, for instance, in Belgian patent specification 503,549. When the starting material condensates are prepared from phenol and formaldehyde, the resulting epoxy novolac resins have several disadvantages which have resulted in a reduction of the desirable broad spectrum utility of said resins as well as certain disadvantages in connection with their method of preparation. A definite need exists today for an improved epoxy novolac resin which when cured has good physical strength properties and which can be easily manufactured from readily available and relatively inexpensive starting materials.

It has been found not only that epoxy derivatives of novolac resins prepared from pure phenol and aldehyde characteristically lack solubility in cheap paraffinic hydrocarbons of the type available from the petroleum industry, but also that the high cost of special solvents needed in preparation and in certain applications of these prior epoxy novolac resins has prevented many commercial uses thereof. Furthermore, these prior pure epoxy novolacs tend to be somewhat brittle after curing, thereby making them unsuitable for use in many applications requiring versatile impact and flexural properties, such as binders for structural laminates and abrasives.

In an effort to improve the properties of epoxy novolac resins, it has heretofore been suggested that one may use as starting novolacs those which are alkylated or even arylated with an unsaturated aliphatic compound, a cycloaliphatic compound, or a vinylidene aromatic compound. Such alkylation or arylation may take place either before or after condensation of phenol with aldehyde, but always before reaction of novolac with halo epoxy alkane. Such suggestions do sometimes and to a degree improve properties of product epoxy novolac resins, but these improvements appear to be always limited by the fact that the product epoxy resins are derived from starting novolacs which have been substituted on the phenol ring with only a single pure organic compound. In any event, an epoxy novolac resin which is soluble in a wide variety of organic solvents, exhibits upon curing good physical strength characteristics, and can be easily manufactured from readily available and relatively inexpensive starting materials, has yet to be realized.

There has now been discovered a surprisingly improved class of epoxy novolac resins which is derived from reacting a haloepoxyalkane with a member of a particular class of phenol aldehyde novolac resins starting materials. This class of starting novolac resins is characterized by the fact that a phenol portion of each novolac resin molecule has been reacted with a certain relatively low cost, well defined mixture of $C_8$ through $C_{13}$ carbocyclic compounds. Such substitution of the phenol portion may be made prior to, or subsequent to, the condensation of the phenol with aldehyde.

The improved epoxy novolac resins realized according to the present invention are characterized by a surprising and unexpected combination of improved properties, including their solubility in a wide variety of organic solvents, and their impact and flexural strength characteristics when thermoset. Consequently, these epoxy resins are ideally suited for use in varnish applications such as those employed to make organic structural (e.g. low void content) and electrical (e.g. low dielectric constant) laminates, as well as in a variety of inorganic bonding applications, as for instance, in making grinding wheels. In addition, the present epoxy novolac resins are easily prepared, and also are low enough in cost to be highly competitive with other polymeric materials as respects many use applications.

SUMMARY

This invention relates to improved epoxy resins derived from a particular class of substituted phenol aldehyde novolac resins having a number average molecular weight of from about 200 to 600 and wherein the phenol portion is reacted under Friedel-Crafts conditions with a certain $C_8$ through $C_{13}$ carbocyclic compound mixture. Utilizing these alkylated novolacs as starting materials, the desired epoxy resins are prepared by reacting a halo epoxyalkane (especially epichlorohydrin) with such starting novolac resins and then dehydrohalogenating.

The starting novolac resins can be either of the so-called prealkylated or of the so-called post-alkylated type. In the case where a post-alkylated phenol aldehyde resin is employed as the starting material, a preformed novolac is conventionally made, as by first reacting from about 0.4 to 0.95 mole of aldehyde per mole of phenol under acid catalyzed aqueous liquid phase reaction conditions until a condensation product of the aldehyde with the phenol is produced. The methods for making such preformed novolac resins and the preformed novolac resins so produced are well known to those of ordinary skill in the prior art and do not constitute a part of the present invention.

The term "phenol" as used in this invention refers conventionally to an aromatic six-membered moiety which is substituted with a hydroxy group. A preferred phenol is phenol itself.

The term "aldehyde" as used in this invention has an established meaning of scope in the art of phenolic resins and is used throughout this disclosure and claims in accordance with such established meaning. Thus, the term "aldehyde" has reference to hydrocarbon compounds incorporating the characteristic group:

Examples of suitable aldehydes known to the phenol-aldehyde resin art include aliphatic aldehydes, such as propionaldehyde, acetaldehyde and the like; aromatic aldehydes such as benzaldehyde and the like, cyclic aldehydes such as furfural and the like and mixtures of such. A preferred aldehyde is formaldehyde.

A preferred procedure for making a preformed novolac starting resin suitable for use in the present invention involves refluxing aldehyde (preferably formaldehyde) and phenol in the afore-indicated mole ratios under aqueous liquid phase conditions with an acidic catalytic material, such as sulphuric acid, phosphoric acid, oxalic acid, and the like for a time of from about 20 to 140 minutes. Then the mixture is dehydrated under vacuum to an end temperature of about 120–160° C. and thereafter is cooled to produce a solid product.

To make a post-alkylated novolac for use in this invention, such a preformed novolac is then reacted under Friedel-Crafts conditions with a controlled mixture of carbocyclic compounds. The mixture of carbocyclic compounds comprises (on a 100 weight percent basis when in a form substantially free of other materials):

(A) from about 10 through 40 weight percent of compounds each molecule of which has:
   (1) the indene nucleus,
   (2) from 9 through 13 carbon atoms,
   (3) as nuclear substituents from 0 through 4 methyl groups,
(B) from about 5 through 70 weight percent of compounds each molecule of which has:
   (1) the dicyclopentadiene nucleus,
   (2) from about 10 through 13 carbon atoms,
   (3) as nuclear substituents from 0 through 3 methyl groups,
(C) from about 15 through 65 weight percent of compounds each molecule of which has:
   (1) a phenyl group substituted by a vinylidene group,
   (2) from about 8 through 13 carbon atoms,
   (3) as substituents from 0 through 3 groups selected from the class consisting of methyl and ethyl,
(D) from about 0 through 5 weight percent divinyl benzene,
(E) provided that the sum total of all such compounds in any given such mixture of carbocyclic compounds is always 100 weight percent.

To make a pre-alkylated novolac for use in this invention, phenol is first reacted under Friedel-Crafts conditions with the above described mixture of carbocyclic compounds. Thereafter, the so-substituted phenol is mixed (usually gradually) with aldehyde (preferably formaldehyde). Water is added with the aldehyde. When the aldehyde is formaldehyde, water is preferred, and formalin is usually used. One employs typically 0.4 to 0.95 mol of aldehyde per mol of phenol (preferably from about 0.5 to 0.85 mol aldehyde per mole of phenol). An additional acidic catalyst material may be added, such as sulfuric acid, phosphorous acid, oxalic acid, an acid mixture, or the like, into the reaction mixture. The pH of the reaction mixture is maintained below 7.0, and, preferably, in the range from about 1 to 4. This reaction mixture is then heated to temperatures of from about 85 to 100° C. (reflux temperature being preferred) for a time sufficient to substantially react most of the substituted phenol and the aldehyde and produce a desired pre-alkylated novolac product. Times of from about 20 to 140 minutes are typical.

At the time when such controlled mixture of carbocyclic compounds is reacted with phenol, or with novolac, as indicated, there can be present in such mixture as diluents inert (i.e. as respects reactivity towards phenol under Friedel-Crafts reaction conditions) organic compounds, such as aromatic and aliphatic hydrocarbons. Thus, there is present, conveniently, at least about 25 weight percent of diluent in such total combination of mixture of carbocylic compounds and diluent, although this value is variable depending upon reactants and reaction conditions. While there is no apparent upper limit on the amount of diluent which may be present, it is preferred that the amount of diluent present be not greater than about 95 weight percent (same basis). Preferably, the amount of diluent ranges from about 15 to 70 weight percent (same basis). Up to about 10 weight percent (same basis) of water can be present, but it is preferred to use substantially anhydrous conditions.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD." Another suitable such mixture is available from Monsanto Company, St. Louis, Mo., under the trade designation "Resin Oil." Still another such mixture is available from the Gulf Oil Company under the trade designation "Resin Former Feed Stock." A presently preferred such mixture is the Monsanto Company "Resin Oil" which is a $C_8$ to $C_{13}$ product cut with a boiling range of from about 300 to 425° F. (150 to about 220° C.) and contains the indicated carbocyclic compound mixture. Shown below in Table I is a breakdown such as is made by vapor phase chromatography showing the composition of these three carbocyclic compound mixtures.

A preferred class of carbocyclic compound starting mixtures comprises from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group (as above described), the percentage of divinyl benzene in such preferred carbocyclic compound mixture being as described above, there being a total of 100 weight percent of these three components (on a 100 weight percent basis, when in a form substantially free of other materials) in a given such mixture.

TABLE I

| | Gulf Oil [2] | Monsanto [3] | Enjay [9] |
|---|---|---|---|
| Vinylidene aromatics: | | | |
|   Styrene $C_8$ [1] | 7.6 | 1.4 | 10.1 |
|   Alpha-methylstyrene $C_9$ | 1.6 | 2.8 | 2.2 |
|   Vinyltoluene $C_9$ | 4.5 | 17.4 | 10.5 |
|   $C_2$ alkylstyrene $C_{10}$ | 0.9 | 6.2 | 5.8 |
|   Dinvylbenzene $C_{10}$ | 0.3 | 1.3 | 1.6 |
| Indenes: | | | |
|   Indene $C_9$ | 12.7 | 17.6 | 12.7 |
|   Methylindene $C_{10}$ | 0.3 | 5.5 | 7.6 |
| Cyclopentadienes: | | | |
|   Isoprene-cyclopentadiene $C_{10}$ | 0.6 | 0.3 | |
|   Dicyclopentadiene $C_{10}$ | 42.7 | 13.9 | 1.1 |
|   Methylcyclopentadiene $C_{11}$ | 12.4 | 4.6 | 2.1 |
| Alkyl aromatics: | | | |
|   Benzene $C_6$ | 0.5 | | 0.1 |
|   Toluene $C_7$ | 3.9 | | 0.8 |
|   $C_2$ Alkylbenzene $C_8$ | 7.4 | 0.4 | 12.1 |
|   $C_3$ Alkylbenzene $C_9$ | 1.2 | 19.2 | 22.2 |
|   $C_4$ Alkylbenzene $C_{10}$ | | 4.1 | 6.3 |
| Naphthalenes: Naphthalene $C_{14}$ | 0.2 | 3.2 | 2.2 |
| Unidentified (aliphatics) | 2.1 | | |
| Total carbocyclic compound mixture content | 84.8 | 72.6 | 55.9 |
| ASTM boil range, ° F. (ASTM D–86): | | | |
|   Initial Boiling Point | 283 | 315 | 307 |
|   10% | 318 | 333 | 320 |
|   50% | 329 | 343 | 342 |
|   90% | 348 | 367 | 401 |
|   End point | 364 | 402 | 411 |
|   Residue | 1.0 | | |
| Specific gravity | 0.952 | 0.933 | 0.90 |

[1] This styrene compound is selected from the group consisting of ethyl styrene and dimethylstyrene.
[2] Available commercially from the Gulf Oil Company as "Resin Former Feed Stock."
[3] Available commercially from the Monsanto Company under the trade designation "Resin Oil."
[4] Available commercially from Enjay Company under the trade designation "Heart Cut LPD."

By the term "dicyclopentadiene" reference is had to a molecule having the structure:

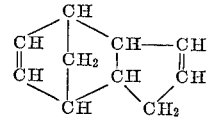

The term "vinylidene" as used herein has generic reference both to vinylidene radicals ($CH_2=C<$), and vinyl radicals ($CH_2=CH-$ or $CH=CH-$); observe that in carbocyclic compound mixtures used in this invention having a phenyl group substituted by a vinylidene group, alphamethyl substitution is included in this definition, as well as styrene, methyl styrene, and ethyl styrene.

By the phrase "when in a form substantially free of other materials" reference is had to a mixture (either of starting materials, of products, or the like, as the case may be) which is substantially free (e.g. on an analytical or theoretic basis) of substances (like inerts) other than such mixture itself. For example, in Table I above, the carbocyclic compound mixtures are composed of indenes, vinylidene aromatics, and dicyclopentadienes, as well as inert diluents such as "alkyl aromatics," "naphthalenes" and "unidentified aliphatics," but each contains a combination (on a 100 weight percent basis in a form substantially free of other materials) of components (indenes, dicyclopentadienes, and vinylidene aromatics) as described above.

To react phenol or novolac as indicated with such an aforedescribed carbocyclic compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol or novolac and suitable Friedel-Crafts acid catalysts are mixed, brought to the proper temperature and the carbocyclic compound mixture metered into the acidified (or catalyzed) phenol.

For purposes of this invention, the reaction of a carbocyclic compound mixture with phenol or novolac as indicated is preferably carried out under Friedel Crafts conditions at temperatures in the range of from about 25 to 200° C. although higher and lower temperatures can be used. Also, the reaction is preferably conducted under liquid phase conditions at or below atmospheric pressures, although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted carbocyclic compound mixture using, for example, vapor phase chromatography.

Freidel-Crafts catalysts which may be used in place of aluminum chloride, or together with aluminum chloride, include:

(a) Other inorganic halides, such as gallium, titanium, antimony and zinc halides (including $ZnCl_2$);

(b) Inorganic acids, such as sulphuric, phosphoric and the hydrogen halides (including H F);

(c) Activated clays, silica gel and alumina, (d) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid, and the like, or with inorganic acids, such as phosphoric acid, sulfuric acid, and the like, and (e) Alkyl, aryl and aralkyl sulfonic acids, such as ethane sulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octyl-phenol sulfonic acid, β-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol (or novolac as indicated) and catalyst can be used, it is particularly convenient to react the carbocyclic compound mixture in the presence of less than about 10 weight percent (based on the phenol) of acid catalyst.

The reaction mass of carbocyclic compound mixture, phenol or novolac, as indicated, and catalyst is heated to a temperature in the range of from about 25 to 200° C. The rate of this reaction is dependent, to some degree, on the temperature employed. In general, the reaction is rapid, and a complete reaction between phenol and carbocyclic compound mixture is preferred. Generally, a heating time of from about 10 minutes to 4 hours is employed. The various process variables are summarized in Table II below:

TABLE II

| Process variable | Broad range | Preferred range, ca. |
|---|---|---|
| Temperature (° C.) | About 25 to 200° C. | 40–125° C. |
| Reaction time | Less than about 4 hours | 10–30 minutes. |
| Catalyst (based on phenol or novolac.) | Less than about 10 weight percent. | 0.1–1.0 weight percent. |
| Inert hydrocarbon diluent [1] | Up to about 75 weight percent. | 20–35 weight percent. |
| Total carbocyclic compound mixture [2]. | About 5 to 125 parts by weight. | 20–80 parts by weight. |

[1] Based on total weight carbocyclic compound mixture and diluent.
[2] Based on 100 parts by weight phenol or novolac.
NOTE.—On a 100 weight percent basis when in a form substantially free of other materials.

The properties of a given so-substituted phenol or novolac are effected by the process conditions used to make that product (e.g., molceular weight distribution, color and the like). The resulting reaction product is, as those skilled in the art will appreciate, a complex mixture of various different substituted products from the reaction of phenol or novolac under Friedel-Crafts conditions with the carbocyclic compound starting mixture to produce phenolic portions which are substituted both on the ring carbon atoms and on phenol hydroxyl oxygen atoms by moieties derived from such carbocyclic compound.

It will be appreciated that the aldehyde to phenol ratios herein described have reference to the total amount of phenol present before a reaction, including the phenol which is substituted by the carbocyclic compound mixture, as described above.

The etherifying agent which introduces the epoxy groups into the above modified phenolaldehyde novolacs is a haloepoxyalkane or a compound which produces a haloepoxyalkane under the reaction conditions. A haloepoxyalkane has the formula:

(1) 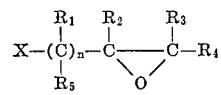

where X is a halogen atom, for instance chlorine or bromine, $n$ is an integer not greater than 4 (i.e. 1, 2, 3, or 4) and $R_1$, $R_2$, $R_3$, $R_4$, and $R_5$ are each individually hydrogen or an alkyl group of less than 6 carbon atoms. The preferred haloepoxyalkane is epichlorohydrin. Compounds which produce haloepoxyalkanes under the reaction conditions are for example, the dihalohydrins of which the alpha- and beta-dichlorohydrins and dibromohydrins are preferred.

A suitable etherification procedure for use in the present invention comprises reacting the modified novolac resin with the etherifying agent in an alkaline catalyzed liquid modium at a temperature of from about 50° to 120° C. Conveniently, one uses a mole ratio of etherifying agent to modified novolac resin of from about 2.5 to 10, (preferably about 3 to 6). The etherification reaction proceeds according to the following scheme:

(2)
$$ROH + EX \xrightarrow{OH^-} ROE + X^-$$

where ROH represents the phenol groups of the novolac resin, EX represents an etherifying agent of Formula 1 and OH⁻ represents the alkali. Any convenient alkaline catalyst may be used. For example, preferred alkaline catalysts are alkali metal hydroxides, such as sodium or potassium hydroxide.

To produce the etherified product (referring to Equation 2) ROE involves hydroxyl ions derived from the alkali so consequently, the liquid employed contains water, as those skilled in the art will appreciate, in order to allow the formation of such ions to occur. For optimum results the amount of water present in the reaction mixture should not greatly exceed the minimum amount of water necessary to bring about the etherification reaction. It has been found that the excess quantities of water tend to react with the etherifying agent which is wasteful of the agent and may, in fact, lead to the production of etherified products having low degrees of etherification.

The preferred etherification procedure comprises mixing the carbocyclic alkylated novolac resin with the etherifying agent, with warming and dispersion, the latter being used in a considerable excess. The temperature of reaction is typically within the range of 60 to 100° C. A portion of the alkali required together with the requisite quantity of water is then added to this mixture which is held under reflux conditions and the remainder of the alkali necessary to complete the reaction is added in small portions.

After the caustic addition is complete, the reaction mixture can be refluxed for an additional period of time up to several hours while maintaining the increased temperature conditions as necessary to complete the reaction. At the end of this additional reflux period the excess etherification agent and water are removed, typically by vacuum stripping.

As will be seen from the above scheme, the amount of alkali present in this type of etherification process should be at least chemically equivalent to the number of phenolic hydroxyl groups it is desired to etherify and preferably a slight excess of alkali on this amount should be employed. It is also advantageous to employ an excess of the etherifying agent. When a compound such as alpha- or beta-dichlorohydrin is used as the etherifying agent, a higher production of alkali is required to neutralize any acid evolved in the formation of the epoxy groups.

The reaction mixture in which the above-mentioned preferred etherification procedure is carried out is typically agitated during the reaction to maintain good contact between the various reacting components therein. This agitation is brought about either by mechanical means or by maintaining the reaction mixture under reflux conditions. When this procedure is adopted it is necessary to have excess etherifying agent present which may be refluxed or, preferably, to add an inert diluent or solvent for the modified novolac resin to the reaction mixture which has a suitable boiling point so that the reaction may be carried out under reflux of the said diluent or solvent. It is also advantageous to carry out the etherification reaction in the presence of excess etherifying agent and in some instances an inert diluent because such a procedure reduces this undesirable possibility that the epoxy groups of the newly formed epoxy resins may interact with unetherified phenolic hydroxyl groups.

In accordance with this invention, at this point in the reaction substantially all of the phenol-hydroxyl groups of the carbocyclic substituted phenol-aldehyde resin have been replaced by glycidal ether groups of the formula:

(3)
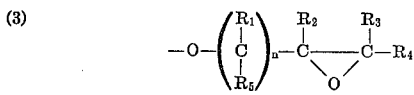

where $n$ is an integer having a value advantageously no greater than 4, and $R_1$, $R_2$, $R_3$, $R_4$, and $R_5$ are each individually hydrogen or an alkyl group of less than 6 carbon atoms. Most preferably each R is hydrogen. The product epoxy resin has an oxirane oxygen content of at least about 1 weight percent and an epoxide equivalent weight of characteristically from about 180 to 300.

If it is desired to further dehydrohalogenate the etherified novolac, there may be added to the resulting mixture a quantity of organic diluent sufficient to bring the solids level below 70% total weight basis (approximately corresponding by parts to the novolac originally charged). Caustic solution may then be charged to the solution and the mixture again refluxed for a period of up to several hours at a temperature of about 80–100° C. At the end of the additional reflux period, the pH of the reaction mixture is made acidic using phosphoric acid. At this point the water may be azeotropically removed using toluene.

When the reaction is completed, the salt formed in the reaction is typically removed by filtration or centrifugation and, therefore, in order to cause the precipitation of the salt, the quantity of water in the reaction mixture should be maintained as small as possible. To accomplish the removal of the salt a filtration aid may be added to the solution followed by pressure filtration to give a salt free varnish.

The epoxy resins of the present invention may be cured with the aid of curing agents such as amines, polyamines, amides, carboxylic acids, and carboxylic acid anhydrides. Examples of typical curing agents are methylenedianiline, methyl nadic anhydride, 4,4'-diaminodiphenyl sulfone, triethylene tetramine, and dicyandiamide. The present resins find many uses, for instance as surface coating or laminating compounds, adhesives or molding compositions.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLES A–D 100 parts of phenol and 0.3 part concentrated sulfuric acid are charged to a suitable reaction vessel and heated to 125° C. 20 parts of carbocyclic compound mixture available commercially as "Resin Oil" from Monsanto Company (described above) are added to the mixture over a period of 45 minutes while keeping the temperature at 120–130° C. The temperature of the mixture is held between 120–130° C. after addition of carbocyclic compound mixture for 30 minutes, then adjusted to 95° C. Dropwise, there is added 38 parts 50% formalin at such a rate so that the reaction exotherm is controlled and a uniform atmospheric boil is initiated. After addition of formalin is complete, the reaction mixture is heated at atmospheric reflux (100° C.) for 1 hour. Then this product mixture is dehydrated under vacuum to an end point of about 130° C. at 28" Hg vacuum. The product is drained from the reaction vessel while hot and fluid and then allowed to solidify. The product is a dark, tacky semisolid at room temperature and pressures.

The foregoing procedure is repeated using different amounts of either the carbocyclic compound mixture or the formaldehyde or with a different catalyst, as indicated above. The results for all examples are summarized in Table III below.

EXAMPLE E 100 parts of phenol and 0.5 part BF₃ etherate complex are charged to a suitable reaction vessel and heated to 125° C. Add 50 parts of the carbocyclic compound mixture of Examples A–D to this mixture over a period of 45 minutes while keeping the temperature at 120–130° C. The temperature of the mixture is held about 125° C.

after addition of such carbocyclic compound mixture for 30 minutes, then adjusted to 95° C.; then 0.8 parts of oxalic acid dihydrate dissolved in water are charged. Dropwise, there is now added 32 parts 50% formalin at such a rate that reaction exotherm is controlled and a uniform atmospheric boil is initiated. After addition of formalin is complete, the reaction mixture is heated at atmospheric reflux (100° C.) for 1 hour. Then the product is dehydrated under vacuum to an end point of 130° C. at 28″ Hg vacuum. The product is drained from the reaction vessel while hot and fluid are allowed to solidify. The product is a tacky, semisolid. (See Table III.)

EXAMPLE F

The procedure of Example A is repeated except that toluene sulfonic acid (0.5 parts by weight) is used in place of sulfuric acid as catalyst.

EXAMPLES G and H 100 parts of phenol and 0.3 parts concentrated sulfuric acid are charged to a suitable reaction vessel and heated to 95° C. Dropwise, there is added 38 parts 50% formalin at such a rate so that the reaction exotherm is controlled and a uniform atmospheric boil is initiated. After addition of formalin is complete, the reaction mixture is heated at atmospheric reflux (100° C.) for 1 hour. Then this intermediate mixture is dehydrated under vacuum to an end point of about 115° C. at 10″ Hg vacuum To this intermediate resin is added 20 parts of carbocyclic compound mixture available commercially as "Resin Oil" from Monsanto Company (described above) over a period of 30 minutes while keeping the temperature at 115–125° C. The temperature of the mixture is held between 115 and 125° C. after addition of carbocyclic compound for 30 minutes. This product mixture is desolvated under vacuum to an end point of about 130° C. at 28″ Hg vacuum. The product is drained from the reaction vessel while hot and fluid and then allowed to solidify.

The foregoing procedure is repeated again using different amounts of the carbocyclic compound mixture and the formaldehyde. The results for all examples are summarized in Table IV below.

EXAMPLE I 100 parts of phenol, 38 parts of 50% formalin and 0.8 part of oxalic acid dihydrate are charged to a suitable reaction vessel and heated to an atmospheric boil. The reaction mixture is heated at atmospheric reflux (100° C.) for 2 hours. After hours of reflux, 0.2 parts of 98% H₂SO₄, diluted in water, is added to reaction mixture. Then this intermediate mixture is dehydrated under vacuum to an end point of about 115° C. at 10″ Hg vacuum. To this intermediate resin is added 80 parts of carbocyclic compound mixture available commercially as "Resin Oil" from Monsanto Company (described above) over a period of 30 minutes while keeping the temperature at 115–125° C. The temperature of the mixture is held between 115 and 125° C. After addition of carbocyclic compound for 30 minutes. This product mixture is dehydrated under vacuum to an end point of about 130° C. at 28″ Hg vacuum. The product is drained from the reaction vessel while hot and fluid and then allowed to solidify. The product is a tacky semisolid.

EXAMPLE J

The procedure of Example I is repeated except that toluene sulfonic acid (0.5 part by weight) is used in place of sulfuric acid as catalyst. For amounts of carbocyclic compound mixture and formaldehyde used, see Table IV.

EXAMPLE K 100 parts of phenol, 32 parts of 50% formalin and 0.8 part of oxalic acid dihydrate are charged to a suitable reaction vessel and heated to atmospheric boil. The reaction mixture is heated at atmospheric reflux (100° C.) for 2 hours. Then this intermediate mixture is dehydrated under vacuum to an end point of 105° C. at 10″ Hg vacuum. Boron trifluoride etherate (0.5 part) is diluted with an equal portion of toluene and added to reaction. The temperature is adjusted to 115° C. To this intermediate resin is added 50 parts of carbocyclic compound mixture available commercially as "Resin Oil" from Monsanto Company (described above) over a period of 30 minutes while keeping the temperature at 115–125° C. The temperature of the mixture is held between 115 and 125° C. after the addition of carbocyclic compound for 30 minutes. This product mixture is desolvated under vacuum to an end point of about 150° C. at 28″ Hg vacuum. The product is drained from the reaction vessel while hot and fluid and then allowed to solidify.

EXAMPLE L

The procedure of Example A is repeated except that toluene sulfonic acid (0.5 part by weight) is used in place of sulfuric acid as catalyst. For amounts of carbocyclic compound mixture and formaldehyde used, see Table IV.

TABLE III.—REACTANTS (PARTS)

| Example: | Phenol | Carbocyclic compound mixture | 50% formaldehyde | Alkylation Catalyst | Parts |
|---|---|---|---|---|---|
| A | 100 | 20 | 38 | H₂SO₄ | 0.3 |
| B | 100 | 40 | 38 | Same as above | 0.3 |
| C | 100 | 80 | 38 | do | 0.3 |
| D | 100 | 40 | 42 | do | 0.3 |
| E | 100 | 50 | 32 | BF₃.etherate | 0.5 |
|   |   |   |   | Oxalic acid | 0.8 |
| F | 100 | 10 | 40 | Toluene sulfonic acid | 0.5 |

TABLE IV.—REACTANTS (PARTS)

| Example: | Phenol | Formaldehyde | Carbocyclic Compound mixture | Condensation Catalyst | Parts | Alkylation Catalyst | Parts |
|---|---|---|---|---|---|---|---|
| G | 100 | 38 | 20 | H₂SO₄ | 0.3 | (¹) | |
| H | 100 | 38 | 40 | Same as above | 0.3 | (¹) | |
| I | 100 | 38 | 80 | Oxalic acid·2H₂O | 0.8 | H₂SO₄ | 0.2 |
| J | 100 | 42 | 40 | Same as above | 0.8 | Toluene sulfonic acid | 0.5 |
| K | 100 | 32 | 50 | do | 0.8 | BF₃.etherate | 0.5 |
| L | 100 | 40 | 10 | Toluene sulfonic acid | 0.5 | (¹) | |

¹ The catalyst used for the condensation of phenol and formaldehyde also functions as the alkylation catalyst.

The foregoing carbocyclic mixture substituted phenol-aldehyde resins each has a number average molecular weight from about 200 to 600. These resins are used to make an epoxy resin of this invention, as follows:

EXAMPLE 1

100 parts of the carbocyclic compound substituted novolac obtained according to Example A is dissolved in 400 parts epichlorohydrin and the temperature raised to 60–100° C. with reflux control. 3 to 5 parts of water are added initially. To this homogeneous solution 66 parts of 50% sodium hydroxide is added slowly over a period of 1 to 2 hours with continuous azeotropic removal of water. After completion of the caustic addition, the reaction mixture is refluxed for ½ to 1 hour at atmospheric pressure. Excess epichlorohydrin and water are then removed by vacuum stripping to an end point of 140° C. at 28" of Hg.

100 parts of toluene is then added to the reaction mixture with cooling to bring the temperature below 100° C. Six parts of 50% solution of sodium hydroxide is added, and the mixture again refluxed for 1 to 2 hours. At the end of this period, the pH of the reaction solution is brought below 70 by using phosphoric acid. Water is again azeotropically removed, followed by filtration of the salt formed by reaction to give a salt free varnish system. The epoxide equivalent weight of the resulting epoxy novolac is about 185.

EXAMPLES 2–12

The foregoing procedure is repeated using as starting materials the various carbocyclic compound substituted novolacs prepared according to Examples A–L. The results for all examples are summarized in Table V.

TABLE V.—REACTANTS (PARTS)

| Example | Starting material example | Carbocyclic substituted novolac | Epichlorhydrin | Total NaOH, 50% solution | Epoxide equivalent weight |
|---|---|---|---|---|---|
| 1 | A | 100 | 400 | 72 | 185 |
| 2 | B | 100 | 356 | 64 | 203 |
| 3 | C | 100 | 295 | 54 | 229 |
| 4 | D | 100 | 353 | 64 | 210 |
| 5 | E | 100 | 345 | 62 | 201 |
| 6 | F | 100 | 420 | 76 | 181 |
| 7 | G | 100 | 400 | 72 | 185 |
| 8 | H | 100 | 356 | 64 | 203 |
| 9 | I | 100 | 295 | 54 | 229 |
| 10 | J | 100 | 353 | 64 | 210 |
| 11 | K | 100 | 345 | 62 | 201 |
| 12 | L | 100 | 420 | 76 | 181 |

Each of the epoxy resins of Examples 1 to 12 has substantially all of its phenol-hydroxyl groups replaced with a glycidyl ether group of the formula:

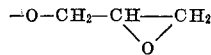

and has an oxirane oxygen content of at least about 1 weight percent. Each product epoxy resin is soluble in a wide variety of organic solvents (for example, acetone, toluene, methyl ethyl ketone, methyl isobutyl ketone, butanol, dimethyl ether of ethylene glycol, benzene). In addition, these products display excellent impact and flexural strength characteristics when thermoset by heat alone at a temperature in excess of about 180° F. (as shown by the Izod Impact Test and ASTM flexural strength test procedure).

What is claimed is:

1. An epoxy resin having an oxirane oxygen content of at least about 1 weight percent and an epoxide equivalent weight of from about 180 to 300, said resin having been made by reacting under alkaline aqueous liquid phase conditions a haloepoxyalkane of the formula:

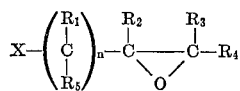

where X is halogen; $R_1$, $R_2$, $R_3$, $R_4$, and $R_5$ are each individually selected from the group consisting of hydrogen and alkyl radicals containing less than 6 carbon atoms each; and $n$ is an integer having a value not greater than 4 with a phenol-aldehyde novalac resin having a number average molecular weight of from about 200 to 600, said phenol-aldehyde resin having had its phenol portion reacted under Friedel-Crafts conditions with a mixture of carbocyclic compounds which comprises (on a 100 weight percent basis when in a form substantially free of other materials):

(A) from about 10 through 40 weight percent (total mixture basis) of compounds each molecule of which has:
 (1) the indene nucleus,
 (2) from 9 through 13 carbon atoms,
 (3) as nuclear substituents from 0 through 4 methly groups,
(B) from about 5 through 70 weight percent (total mixture basis) of compounds each molecule of which has:
 (1) the dicyclopentadiene nucleus,
 (2) from 10 through 13 carbon atoms,
 (3) as nuclear substituents from 0 through 3 methyl groups,
(C) from about 15 through 65 weight percent (total mixture basis) of compounds each molecule of which has:
 (1) a phenyl group substituted by a vinylidene group,
 (2) from 8 through 13 carbon atoms,
 (3) as substituents from 0 through 3 groups selected from the class consisting of methyl and ethyl.

2. The epoxy resin of claim 1 wherein said haloepoxyalkane is epichlorohydrin.

3. The epoxy resin of claim 1 wherein the carbocyclic substituted phenol-aldehyde resin is pre-substituted with said mixture of carbocyclic compounds.

4. The epoxy resin of claim 1 wherein the carbocyclic substituted phenol-aldehyde resin is post-substituted with said mixture of carbocyclic compounds.

5. The epoxy resin of claim 1 wherein the carbocyclic substituted phenol-aldehyde resin is characterized by a weight ratio of carbocyclic compound mixture to phenol of from 0.2:1.0 to 0.8:1.0.

6. The epoxy resin of claim 1 wherein the carbocyclic substituted phenol-aldehyde resin is characterized by a molar ratio of aldehyde to phenol of from 0.5:1 to 0.85:1.

7. In a process for making an epoxy resin, the improvement which comprises the step of:
contacting under alkaline aqueous liquid phase conditions a haloepoxyalkane of the formula:

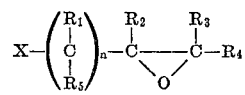

where X is halogen; $R_1$, $R_2$, $R_3$, $R_4$, and $R_5$ are each individually selected from the group consisting of hydrogen and alkyl radicals containing less than 6 carbon atoms each; and $n$ is an interger having a value not greater than 4 with a phenol-aldehyde novolac resin, having a number average molecular weight of from about 200 to 600 and having been made by reacting its phenol portion under Friedel-Crafts conditions with a mixture of carbocyclic compounds which comprises (on a 100 weight percent basis when in a form substantially free of other materials):

(1) from about 10 through 40 weight percent (total mixture basis) of compounds each molecule of which has:
 (a) the indene nucleus,
 (b) from 9 through 13 carbon atoms,
 (c) as nuclear substituents from 0 through 4 methyl groups,
(2) from about 5 through 70 weight percent (total mixture basis) of compounds each molecule of which has:
 (a) the dicyclopentadiene nucleus,
 (b) from 10 through 13 carbon atoms,
 (c) as nuclear substituents from 0 through 3 methyl groups,
(3) from about 15 through 65 weight percent (total mixture basis) of compounds each molecule of which has:
 (a) a phenyl group substituted by a vinylidene group,
 (b) from 8 through 13 carbon atoms, (c) as substituents from 0 through 3 groups selected from the class consisting of methyl and ethyl, (4) from about 0 through 5 weight percent divinyl benezene, (5) provided that the sum total of all such compounds in any given such mixture of carbocyclic compounds is always 100 weight percent, while maintaining a temperature of from about 50° to 120° C.

8. The process of claim 7 further comprising adding at least a sufficient amount of organic inert diluent to the product so produced to bring the total resin solids content of the resulting mixture below about 70 percent (total weight basis), and thereafter adding at least sufficient amounts of an aqueous solution of an alkali metal hydroxide to the resulting mixture so as to substantially complete dehydrohalogenation of the epoxy novolac while maintaining a pH greater than about 7.0 and a temperature of less than about 100° C.

9. The process of claim 7 further comprising filtration of the phenol-aldehyde-epichlorohydrin reaction product to remove any salts formed during reaction.

10. The process of claim 7 wherein the carbocyclic substituted phenol-aldehyde resin is pre-substituted with the carbocyclic compound mixture.

11. The process of claim 7 wherein the carbocyclic substituted phenol-aldehyde resin is post-substituted with the carbocyclic compound mixture.

12. The process of claim 7 wherein the carbocyclic substituted phenol-aldehyde resin is characterized by a weight ratio of carbocyclic compound mixture of phenol of from about 0.2:1.0 to 0.8:1.0.

13. The process of claim 7 wherein the carbocyclic substituted phenol-aldehyde resin is characterized by a mole ratio of aldehyde to phenol of from about 0.5:1 to 0.85:1.

14. A varnish comprising a solution of from about 30 to 80 parts by weight of the epoxy resin of claim 1 dissolved in an inert hydrocarbon solvent, the balance of up to 100 parts by weight of such varnish comprising said hydrocarbon solvent.

References Cited

UNITED STATES PATENTS

| | | | |
|---|---|---|---|
| 2,388,584 | 12/1945 | Ward | 260—619 |
| 2,460,724 | 2/1949 | Allen et al. | 260—57X |
| 2,859,205 | 11/1958 | Lection | 260—51 |
| 2,897,175 | 7/1959 | Howe et al. | 260—58 |

FOREIGN PATENTS

| | | | |
|---|---|---|---|
| 774,582 | 5/1957 | Great Britain | 260—151 |

WILLIAM H. SHORT, Primary Examiner

H. SCHAIN, Assistant Examiner

U.S. Cl. X.R.

260—33.2, 33.4, 51, 53, 58, 59